(12) United States Patent
Goodno et al.

(10) Patent No.: US 8,837,033 B2
(45) Date of Patent: Sep. 16, 2014

(54) NESTED LOOP COHERENT BEAM COMBINING SYSTEM

(71) Applicant: Northrop Grumman Systems Corporation, Falls Church, VA (US)

(72) Inventors: Gregory D. Goodno, Los Angeles, CA (US); Eric Cheung, Torrance, CA (US); William H. Long, Torrance, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 197 days.

(21) Appl. No.: 13/683,005

(22) Filed: Nov. 21, 2012

(65) Prior Publication Data

US 2014/0139903 A1    May 22, 2014

(51) Int. Cl.
*G02F 1/01* (2006.01)
*G02B 26/00* (2006.01)
*H01S 3/13* (2006.01)
*H01S 3/23* (2006.01)
*H01S 3/10* (2006.01)

(52) U.S. Cl.
CPC .............. *G02F 1/01* (2013.01); *H01S 3/1305* (2013.01); *H01S 3/2308* (2013.01); *H01S 3/1307* (2013.01); *H01S 3/2383* (2013.01); *H01S 3/10053* (2013.01)
USPC .......................................... 359/279; 359/239

(58) Field of Classification Search
CPC ....... G01Q 20/02; G01Q 20/04; G01Q 60/32; G01N 21/39; G01N 2021/399; G01N 21/6458; G01N 21/276; G01N 21/3504; G01N 21/45; G01N 21/6408; G01N 23/223; G01N 15/0625; G01N 15/1434; G01N 15/1468
USPC ................. 359/239, 237, 279; 372/31, 29.02; 356/484, 485; 378/86
See application file for complete search history.

(56) References Cited

U.S. PATENT DOCUMENTS 7,058,098 B1    6/2006  Shay
7,187,492 B1    3/2007  Shay
(Continued)

FOREIGN PATENT DOCUMENTS

EP          0980123          2/2000
WO       2008045655         4/2008

OTHER PUBLICATIONS

Anderegg, Jesse et al; Coherently Coupled High Power Fiber Arrays; Proceedings of SPIE, vol. 6102; Feb. 9, 2006; pp. 6102OU-01 through 6102OU-05; XP055103265; ISSN: 0277-786X; DOI: 10.1117/12.650138.

(Continued)

*Primary Examiner* — William Choi
*Assistant Examiner* — Brandi Thomas
(74) *Attorney, Agent, or Firm* — Carmen Patti Law Group, LLC

(57) ABSTRACT

A nested loop system for combining coherent laser beams. The system includes multiple laser amplifiers each configured for emitting one of the laser beams, an output beam splitter configured for sampling each laser beam and for coupling each sampled laser beam to an inner feedback loop module, an output beam sampler configured for splitting the combined beam into a primary and a sampled output beam and for coupling the sampled output beam to the inner feedback loop module, multiple inner loop phase modulators each paired with one of the laser amplifiers, and the inner feedback loop module. For each laser amplifier the inner feedback loop module is configured to use the sampled output beam and the sampled laser beam associated with that laser amplifier to create a different inner loop feedback signal and to couple that inner loop feedback signal to that laser amplifier paired inner loop phase modulator.

20 Claims, 6 Drawing Sheets

(56) References Cited

U.S. PATENT DOCUMENTS

| | | | |
|---|---|---|---|
| 7,203,210 | B2 | 4/2007 | Sox et al. |
| 7,440,174 | B2 | 10/2008 | Rice et al. |
| 7,884,997 | B2 * | 2/2011 | Goodno .................. 359/349 |
| 2007/0201795 | A1 | 8/2007 | Rice et al. |
| 2011/0032604 | A1 | 2/2011 | Rothenberg et al. |
| 2012/0188626 | A1 | 7/2012 | Rothenberg et al. |
| 2012/0212802 | A1 | 8/2012 | Rothenberg et al. |

OTHER PUBLICATIONS

Vorontsov, M.A.; Stochastic Parallel-Gradient-Descent Technique for High-Resolution Wave-Front Phase-Distortion Correction; Journal of the Optical Society of America A.; vol. 15, No. 10; Oct. 1, 1998; pp. 2745-2758; XP055103264; ISSN: 1084-7529; DOI: 10.1364/JOSAA.15.002745.

Fan, T.Y.; , The Effect of Amplitude (Power) Variations on Beam Combining Efficiency for Phased Arrays, Selected Topics in Quantum Electronics, IEEE Journal of, vol. 15, No. 2, pp. 291-293, Mar.-Apr. 2009.

Goodno, G.D. et al; Brightness-Scaling Potential of Actively Phase-Locked Solid-State Laser Arrays, Selected Topics in Quantum Electronics, IEEE Journal of, vol. 13, No. 3, pp. 460-472, May-Jun. 2007.

Fan, T.Y.; Laser beam combining for high-power, high-radiance sources, Selected Topics in Quantum Electronics, IEEE Journal of, vol. 11, No. 3, pp. 567-577, May-Jun. 2005.

Wang, X. et al; 350-W Coherent Beam Combining of Fiber Amplifiers With Tilt-Tip and Phase-Locking Control, Photonics Technology Letters, IEEE , vol. 24, No. 19, pp. 1781-1784, Oct. 1, 2012.

Wagner, T.J.; Fiber laser beam combining and power scaling progress: Air Force Research Laboratory Laser Division. Proc. SPIE 8237, Fiber Lasers IX: Technology, Systems, and Applications, 823718 (Feb. 9, 2012).

Xiao Li et al; Coherent beam combination of two slab laser amplifiers based on stochastic parallel gradient descent algorithm, Chin. Opt. Lett. 9, 101401—(2011).

Xiao Li et al; Coherent beam combining with double stochastic approximation based on logic comparison algorithm, Optics Express, vol. 17, No. 2, Jan. 19, 2009 pp. 385-394.

* cited by examiner

NESTED LOOP COHERENT BEAM COMBINING SYSTEM

BACKGROUND

Coherently combined laser arrays having large numbers of laser channels are of interest since they can be used to obtain high power laser beams. There are two general approaches used to obtain such a combination of coherent laser beams. The first approach is tiled beam combining, and the second is filled aperture beam combining. In the tiled beam approach, lasers to be combined are laid side by side and pointed in the same direction such that they co-propagate as a single beam. Whereas, in the filled aperture beam approach, a beam splitting optical system is used in reverse to combine the beams so that the combined beams lie on top of one another and co-propagate as a single beam. Gaps between beams occur with the Tiled Beam approach as it is impossible to squeeze two adjacent beams so close together that no dead space occurs between them regardless of the tiling optics used. The dead space degrades the peak brightness that can be achieved after the beam has propagated into the far field. A filled aperture approach can, however, eliminate these tiling gaps thereby enhancing the peak brightness of the beam.

These arrays all require some means of actively controlling the phases of the individual lasers in order to synchronize their phases. Active laser phase control feedback methods generally fall into one of three categories: (1) Heterodyne as reported in J. Anderegg, S. Brosnan, E. Cheung, P. Epp, D. Hammons, H. Komine, M. Weber, and M. Wickham, "Coherently coupled high-power fiber arrays," in *Fiber Lasers III: Technology, Systems, and Applications*, A. Brown, J. Nilsson, D. J. Harter, and A. Tunnermann, eds., Proc. SPIE 6102, 61020U-1 (2006), (2) Synchronous Multi-dither (LOCSET) as reported in U.S. Pat. No. 7,058,098, U.S. Pat. No. 7,187,492, and U.S. Pat. No. 7,223,433, and (3) Stochastic Parallel Gradient Descent (SPGD) which is usually referred to as Hill Climbing as reported in M. A. Vorontsov and V. P. Sivokon, "Stochastic parallel-gradient-descent technique for high-resolution wave-front phase-distortion correction," J. Opt. Soc. Am. A 15, 2745-2758 (1998). These three approaches differ in the method by which they develop error signals for feedback. The Heterodyne approach first combines a frequency-shifted reference with the tiled output beam and then measures the phase of the resultant beat signals for each tile. In the Synchronous Multi-dither approach each beam is tagged with a small phase dither and a single detector senses the combined output beam. Radiofrequency (RF) mixers are then used to isolate each phase from the combined output beam. In the Hill Climbing approach, the phase of each beam is changed in a digital step, and the resultant combined beam power is then observed to determine whether the combined far field power increased or decreased. Results of these three approaches are fed back to control the phases of the individual lasers.

To phase-lock large numbers of laser channels, it is necessary to select a phase-locking approach that is scalable while maintaining low parts count and minimizing system complexity. All phase-locking methods have intrinsic limits to their channel count scalability, which ultimately limits the achievable closed-loop control bandwidth. For the purpose of scaling phase control to large channel counts with large closed-loop control bandwidth, it has been found advantageous to organize and control lasers in groups or sub-nests. The individual lasers in each group are phaselocked together using one of the methods described above, and subsequently the groups are locked together to lock the overall array. This nesting approach can be extended to multiple levels of nesting. The advantage of nesting is that it provides a means to increase channel count scalability in the laser array by limiting the number of channels in any one group to preserve the closed-loop control bandwidth of the underlying phase-locking control method.

BRIEF DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

Figure 1:
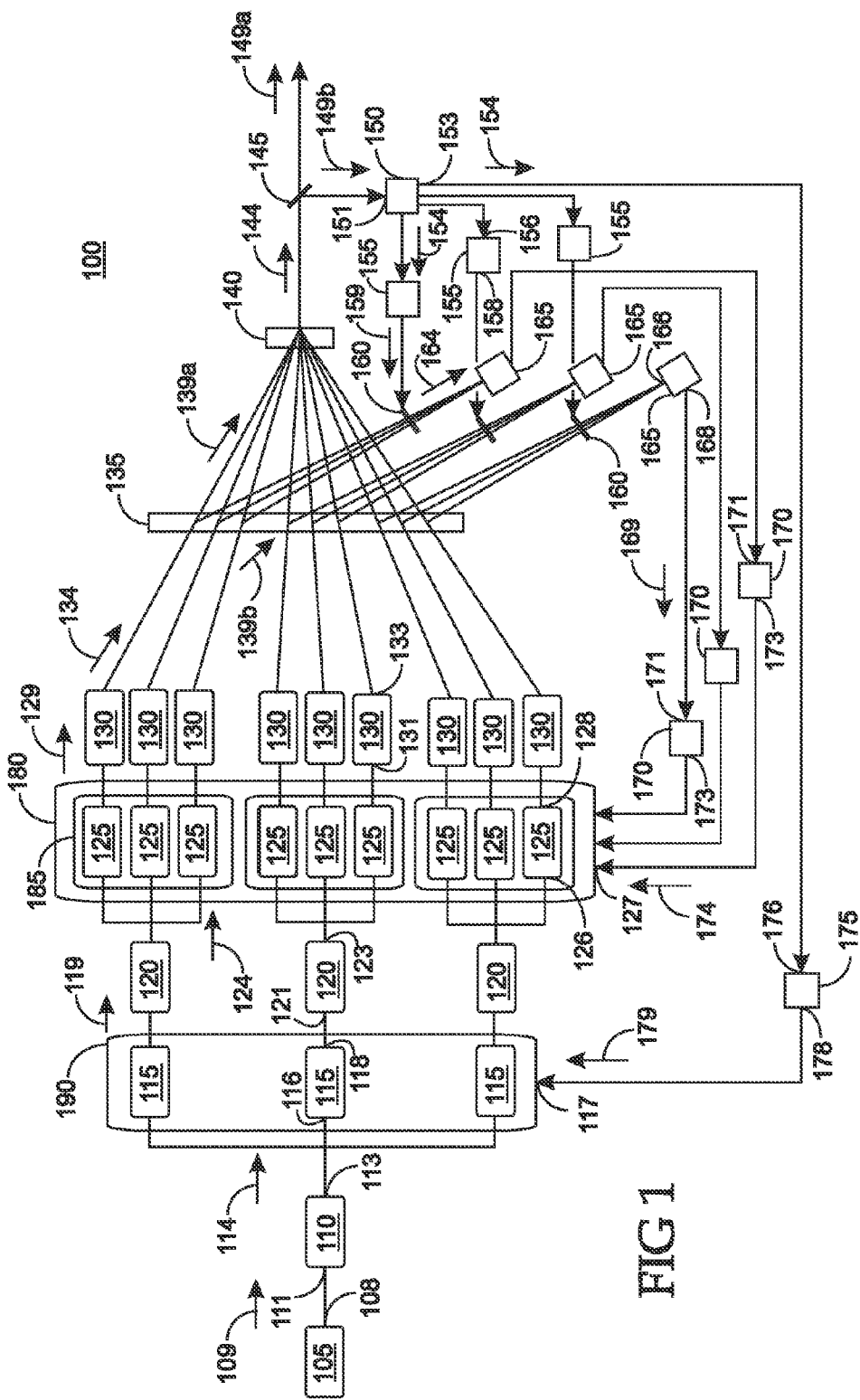
FIG. 1 is a drawing of a block diagram of a nested loop system with single stage beam combiner as described in various representative embodiments.

As shown in the drawings for purposes of illustration and as described below, novel techniques are disclosed for a nested loop system with a single stage beam combiner. Individual laser beams in the output beam of a tiled beam combining approach can be sampled relatively easily due to their spatial separation. Whereas, in a filled aperture beam combining approach this is not possible since the individual beams all overlay each other and therefore are geometrically indistinguishable from one another in the output beam. Thus, there is a need for a means of accurately adjusting the phases of individual laser beams in the output beam of a nested system employing a filled aperture beam combining approach.

In order to phaselock a group or sub-group of beams, it is necessary to generate an optically sampled replica of the laser beams comprising that sub-group without perturbing their relative optical phases. This is difficult for single-stage beam combining approaches, since the means of optical sampling of the sub-group can introduce relative phase errors between the elements of the sub-group which differ between the sampled beam replica and the combined output beam. Hence, a feedback system that phase locks the elements of the sub-group using an optically sampled replica will not, in general, result in a combined output beam with the elements locked in-phase to one another owing to the non-common phase shifts between the sampled optical replica and the combined output beam. Systems and methods are disclosed herein for ensuring that the phase shifts among the elements of each sub-group are identical in both the sampled optical replica and in the combined output beam.

In representative embodiments disclosed herein, systems and methods are disclosed for efficiently and accurately implementing nested loops in a single stage combining geometry structure, both filled aperture and tiled aperture. These embodiments are capable of achieving the benefits of a large channel count of a nested loop scheme in the context of a geometrically filled aperture coherent beam combining architecture, as well as a tiled aperture geometry.

For any nested loop architecture at least two and possibly more levels of detection are needed to provide feedback for appropriately adjusting the phases of the lasers. In the descriptions below two levels of detection are referred to for illustrative purposes; however any number of levels may be nested. A detector is needed for each subset of beams to be locked together. These detectors are referred to herein as inner loop detectors. A detector to detect the phases between locked subsets is also needed. This detector is referred to herein as an outer loop detector. The signal from the outer loop detector is applied to directly lock the phases of the subsets of beams together and is used to extract relative phase information for all individual elements of all the subsets directly. This phase information is used to control diagnostic phase adjustors that adjust the phases of the beams that reach the inner loop detectors but without directly impacting the phase of the high power beam lasers that are being combined.

Geometric beam combining is hypersensitive to small misalignments or perturbations in the path lengths between the beams that are being combined. The system is basically an interferometer wherein changes in the relative paths of the different beams by only a fraction of an optical wavelength which is on the order of tens of nanometers is enough to noticeably degrade the coherent combining efficiency. Such high precision is difficult to obtain using standard optics. For that reason, it is necessary and advantageous to perform the phase measurement on the beam downstream of all the geometric beam combining optics. This is accomplished in representative embodiments using the outer loop detector. The geometrically combined final output beam is sampled in order to detect any relative phase differences.

FIG. 1 is a drawing of a block diagram of a nested loop system 100 with single stage beam combiner as described in various representative embodiments. For ease and clarity of illustration, only one or a few like elements in the figures may be noted using their identifying numerals The system 100 comprises a master oscillator 105, an outer loop beam splitter 110, multiple outer loop phase modulators 115, multiple inner loop beam splitters 120, multiple inner loop phase modulators 125, multiple laser amplifiers 130, an output beam splitter 135, a beam combiner optical system 140, an output beam sampler 145, an outer loop detector 150, multiple synchronous processors 155, multiple diagnostic phase adjusters 160, multiple inner loop detectors 165, multiple inner loop processors 170, and an outer loop processor 175. The inner loop phase modulators 125 are grouped into multiple sub-nests 185, and the multiple sub-nests 185 are in turn grouped into a nest 180. The beam combiner optical system 140 may comprise a diffractive optical element or a set of beam splitting or tiling optics.

Figure 2:
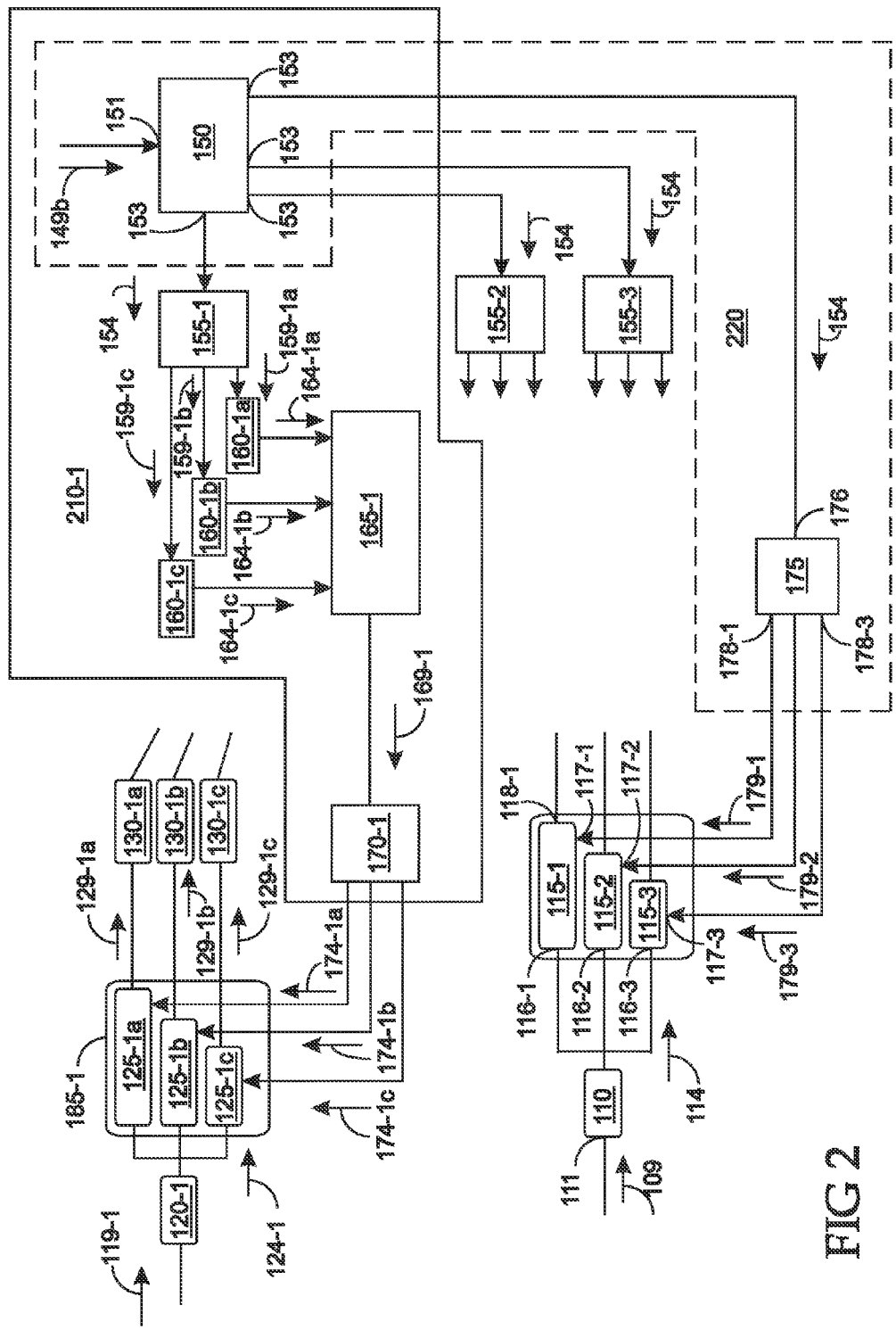
FIG. 2 is a detailed view of a part of FIG. 1.

In the representative embodiment of FIG. 1, a master-oscillator beam 109 is generated by the master oscillator 105 and is split into multiple beans by the outer loop beam splitter 110. Each of the split beams is then separately transferred to one of the multiple outer loop phase modulators 115 which adjusts the phase of the beam that it receives based on an outer loop feedback signal 179 which it receives from an outer feedback loop module 220 (dashed outline in FIG. 2) comprising the outer loop detector 150 and the outer loop processor 175. The phase adjusted signals from each of the multiple outer loop phase modulators 115 is separately transferred to one of multiple inner loop beam splitters 120 which splits the signal that it receives into multiple beams which are separately transferred to one of the multiple inner loop phase modulators 125 in its associated sub-nest 185. Each of the multiple inner loop phase modulators 125 adjusts the phase of the signal that it receives based on an inner loop feedback signal 174 which it receives from an inner feedback loop module 210 (FIG. 2) comprising the outer loop detector 150, one of the synchronous processors 155, one of the diagnostic phase adjusters 160 which could be multiple diagnostic phase adjusters 160-1a,160-1b,160-1c as shown in FIG. 2, one of the inner loop detectors 165, and one of the inner loop processors 170. Note that only the first inner feedback loop module 210-1 is shown in FIG. 2 and that it shares the outer loop detector 150 with the other inner feedback loop modules 210 and with the outer loop feedback loop module 220. The phase adjusted signals from each of the inner loop phase modulators 125 is separately transferred to one of the laser amplifiers 130 which each amplify the signal that it receives. The output signals from the multiple laser amplifiers 130 are each split into a primary laser beam 139a and a sampled laser beam 139b. The sampled laser beams 139b are directed to one of the diagnostic phase adjusters 160 of the inner feedback loop module 210. The primary laser beams 139a are directed to the beam combiner optical system 140 which combines them into a single combined beam 144. The single combined beam 144 is then sampled by the output beam sampler 145 by splitting the beam that it receives into a primary output beam 149a and a sampled output beam 149b. The sampled output beam 149b is directed to the outer loop detector 150 as one of the inputs to the inner feedback loop modules 210 and as the input to the outer feedback loop module 220. The primary output beam 149a is outputted from the system.

FIG. 2 is a detailed view of a part of FIG. 1. Note that in FIG. 2, the synchronous processors 155 of FIG. 1 have been identified as a first synchronous processor 155-1, a second synchronous processor 155-2, and a third synchronous processor 155-3. For clarity and ease of illustration, the components following the second and third synchronous processors 155-2,155-3 are not shown in FIG. 2. However, the discussion of components that follow the first synchronous processor 155-1 is representative of that for the second and third synchronous processors 155-2,155-3. Also each diagnostic phase adjuster 160 shown in FIG. 1 is represented in FIG. 2 as a first diagnostic phase adjuster 160-1a, a second diagnostic phase adjuster 160-1b, and a third diagnostic phase adjuster 160-1c.

The outer loop detector 150 outputs only one signal which is split into duplicate outer-loop-detector signals 154 that are transferred to the first, second, and third synchronous processors 155-1,155-2,155-3 and to the outer loop processor 175. In other representative embodiments, the multiple synchronous processors 155 could be replaced by a single synchronous processor 155. For clarity and ease of illustration in FIG. 2, coupling points are omitted except for those on the outer loop detector 150. Further for clarity and ease of illustration, the inner feedback loop module 210 and the outer feedback loop module 220 were not shown in FIG. 1 but are shown in FIG. 2.

The first synchronous processor 155-1 outputs a first synchronous-processor signal 159-1a to the first diagnostic phase adjuster 160-1a, a second synchronous-processor signal 159-1b to the second diagnostic phase adjuster 160-1c, and a third synchronous-processor signal 159-1c to the third diagnostic phase adjuster 160-1c. A first inner loop detector 165-1 receives a first diagnostic-phase-adjuster beam 164-1a from the first diagnostic phase adjuster 160-1a, a second diagnostic-phase-adjuster beam 164-1b from the second diagnostic phase adjuster 160-1b, and a third diagnosticphase-adjuster beam 164-1c from the third diagnostic phase adjuster 160-1c. The first inner loop detector 165-1 then outputs a first inner-loop-detector signal 169-1 which is transferred to a first inner loop processor 170-1 which processes these signals as described above. The first inner loop processor 170-1 then transfers processed signals as the first inner loop feedback signal 174-1a, the second inner loop feedback signal 174-1b, and the third inner loop feedback signal 174-1c separately to the first inner loop phase modulator 125-1a, the second inner loop phase modulator 125-1b, and the third inner loop phase modulator 125-1c.

Also in FIG. 2, the outer loop processor 175 processes the outer-loop-detector signal 154 and processes that signal to output a first outer loop feedback signal 179-1, a second outer loop feedback signal 179-2, and a third outer loop feedback signal 179-3 which are separately transferred to a first outer loop phase modulator 115-1, a second outer loop phase modulator 115-2, and a third outer loop phase modulator 115-3.

Referring to FIG. 1, the master oscillator 105 has a master-oscillator output 108 which couples a master-oscillator beam 109 generated by the master oscillator 105 to an outer-loop-beam-splitter input 111 of the outer loop beam splitter 110 wherein such coupling could be enabled optically. The outer loop beam splitter 110 splits the master-oscillator beam 109 into multiple outer-loop-beam-splitter beams 114. The outer loop beam splitter 110 has an outer-loop-beam-splitter output 113 which couples each outer-loop-beam-splitter beam 114 to a first outer-loop-phase-modulator input 116 of a different one of the multiple outer loop phase modulators 115 wherein such coupling could be enabled optically. Each outer loop phase modulator 115 adjusts the phase of the beam it receives based on an outer loop feedback signal 179 coupled from the outer loop processor 175 wherein such coupling could be enabled electronically or by other appropriate means. Each outer loop phase modulator 115 has an outer-loop-phase-modulator output 118 which couples an associated outer-loop-phase-modulated beam 119 to an inner-loop-beam-splitter input 121 of a different one of the inner loop beam splitters 120 wherein such coupling could be enabled optically. Each of the multiple inner loop beam splitters 120 splits the outer-loop-phase-modulated beam 119 incident at its input into associated multiple inner-loop-beam-splitter beams 124. Each of the multiple inner loop beam splitters 120 has an inner-loop-beam-splitter output 123 which couples an associated inner-loop-beam-splitter beam 124 to a first inner-loop-phase-modulator input 126 of a different one of the multiple inner loop phase modulators 125 wherein such coupling could be enabled optically. Each inner loop phase modulator 125 adjusts the phase of the beam it receives based on an inner loop feedback signal 174 coupled from an associated inner loop processor 170 wherein such coupling could be enabled electronically or by other appropriate means. Each of the multiple inner loop phase modulators 125 has an inner-loop-phase-modulator output 128 which couples an inner-loop-phase-modulated beam 129 to a laser-amplifier input 131 of a different one of the multiple laser amplifiers 130 wherein such coupling could be enabled optically. Each laser amplifier 130 creates a laser beam 134 by amplifying the beam it receives.

Each laser amplifier 130 has a laser-amplifier output 133 which couples the laser beam 134 to the output beam splitter 135 which splits each incident laser beam 134 into a primary laser beam 139a and a sampled laser beam 139b wherein such coupling could be enabled optically. Each primary laser beam 139a is coupled to a beam combiner optical system 140 which combines the primary laser beams 139a into a combined beam 144 and couples the combined beam 144 to the output beam sampler 145 wherein such coupling could be enabled optically. The output beam sampler 145 splits the combined beam 144 into a primary output beam 149a which is the output of the system 100 and a sampled output beam 149b which is used in the inner feedback loop module 210 wherein such coupling could be enabled optically.

The output beam sampler 145 couples the sampled output beam 149b to an outer-loop-detector input 151 of the outer loop detector 150 wherein such coupling could be enabled optically. Each sampled laser beam 139b is coupled to a diagnostic phase adjuster 160 wherein such coupling could be enabled optically. The outer loop detector 150 has multiple outer-loop-detector outputs 153 which couple an outer-loop-detector signal 154 representative of the power contained in the sampled output beam 149b to an outer-loop-processor input 176 of the outer loop processor 175 wherein such coupling could be enabled electronically or by other appropriate means and multiple of which each separately couple an outer-loop-detector signal 154 again representative of the sampled output beam 149b to a synchronous-processor input 156 of one of multiple synchronous processors 155 wherein such coupling could be enabled electronically or by other appropriate means. Each synchronous processor 155 processes the signal that it receives to create a set of multiple synchronous-processor signals 159 in accordance with the method chosen for actively changing the phases of the individual laser beams 134 in order to synchronize their phases. Each of the multiple synchronous processors 155 has a synchronous processor output 158 which couples the synchronous-processor signal 159 to a diagnostic phase adjuster input 161 of the diagnostic phase adjuster 160 wherein such coupling could be enabled electronically or by other appropriate means. Each of the diagnostic phase adjusters 160 adjusts the phases of their associated, incident sampled laser beams 139b and transfers the adjusted sampled laser beams 139b as diagnostic-phase-adjuster beams 164 to an inner-loop-detector input 166 of its associated inner loop detector 165. This transfer could occur optically. Each inner loop detector 165 converts the diagnostic-phase-adjuster beam 164 at its input to an inner-loop-detector signal 169. Each of the multiple inner loop detectors 165 has an inner-loop-detector output 168 which couples its associated inner-loop-detector signal 169 to an inner-loop-processor input 171 of the inner loop processor 170 wherein such coupling could be enabled electronically or by other appropriate means. Each inner loop processor 170 processes the signal that it receives to create an inner loop feedback signal 174 in accordance with the method chosen for actively changing the phases of the lasers in order to synchronize their phases.

As disclosed above, each of the multiple inner loop processors 170 has an inner-loop-processor output 173 which couples its inner loop feedback signal 174 to the second inner-loop-phase-modulator input 127 of its associated inner loop phase modulator 125 where such coupling could be enabled electronically or by other appropriate means. The second inner-loop-phase-modulator input 127 is also referred to as the electronic inner-loop-phase-modulator input 127, and the first inner-loop-phase-modulator input 126 is also referred to as the optical inner-loop-phase-modulator input 126. The inner loop phase modulator 125 adjusts the phase of the inner-loop-phase-modulated beam 129 based on the inner loop feedback signal 174. Also as disclosed above, the outer loop processor 175 has an outer-loop-processor output 178 which couples an outer loop feedback signal 179 to a second outer-loop-phase-modulator input 117 of each outer loop phase modulator 115 wherein such coupling could be enabled electronically or by other appropriate means. The second outer-loop-phase-modulator input 117 is also referred to as the electronic outer-loop-phase-modulator input 117, and the first outer-loop-phase-modulator input 116 is also referred to as the electronic outer-loop-phase-modulator input 116. The outer loop phase modulator 115 adjusts the phase of the outer-loop-phase-modulated beam 119 based on the outer loop feedback signal 179.

Typically in laser combiner systems a multi-kilohertz closed loop bandwidth for feedback signals is required in order to adjust the phases of the high power lasers due to the dynamic phase variations that naturally occur. The bandwidth required for closed loop feedback can be one of the design constraints which limit the number of channels that can be combined in practical systems. The bandwidth necessary to adjust the diagnostic phase adjusters is expected to be orders of magnitude less than the bandwidth required to control the high powered phases directly. This is because any non-common path phase errors imposed between the output beam splitter 135 and the beam combiner optical system 140 or between the output beam splitter 135 and the inner loop detectors 165 will be either static or very slowly varying (e.g., due to thermal drifts in macroscopic optics alignment). There is an inverse relationship between the number of lasers scaled and the closed loop bandwidth of the phase locking. If the number of lasers in an array is doubled, everything else being equal, the closed loop bandwidth will be cut in half. So, to insure effective feedback control it is advantageous to have detector signals from each subset of laser amplifiers 130 and the signal from the outer loop detector 150 control only a limited number of elements individually. The diagnostic phase adjusters 160 can use the outer-loop-detector signal 154 to control the phases of the lower power beam samples that reach the inner loop detector 165. While this control is over all of the laser channels, it greatly reduces bandwidth requirements as noted above and hence allows scaling to very large channel counts.

Figure 3:
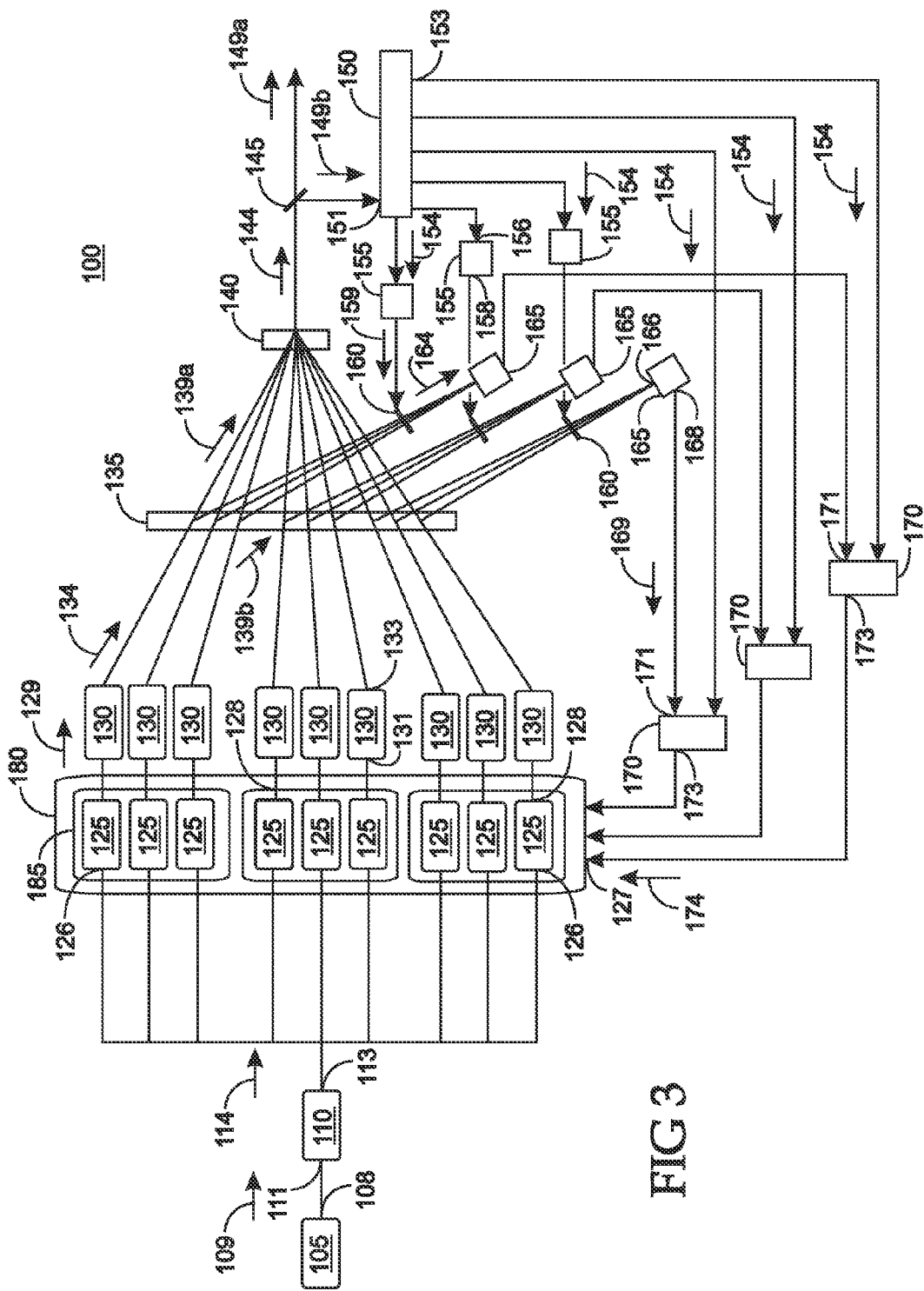
FIG. 3 is another drawing of a block diagram of a nested loop system with single stage beam combiner as described in various representative embodiments.

FIG. 3 is another drawing of a block diagram of a nested loop system 100 with single stage beam combiner as described in various representative embodiments. For ease and clarity of illustration, only one or a few like elements in the figures may be noted using their identifying numerals The system 100 comprises a master oscillator 105, an outer loop beam splitter 110, multiple inner loop phase modulators 125, multiple laser amplifiers 130, an output beam splitter 135, a beam combiner optical system 140, an output beam sampler 145, an outer loop detector 150, multiple synchronous processors 155, multiple diagnostic phase adjusters 160, multiple inner loop detectors 165, and multiple inner loop processors 170. The inner loop phase modulators 125 are grouped into multiple sub-nests 185, and the multiple sub-nests 185 are in turn grouped into a nest 180. The beam combiner optical system 140 may comprise a diffractive optical element or a set of beam splitting or tiling optics.

Figure 4:
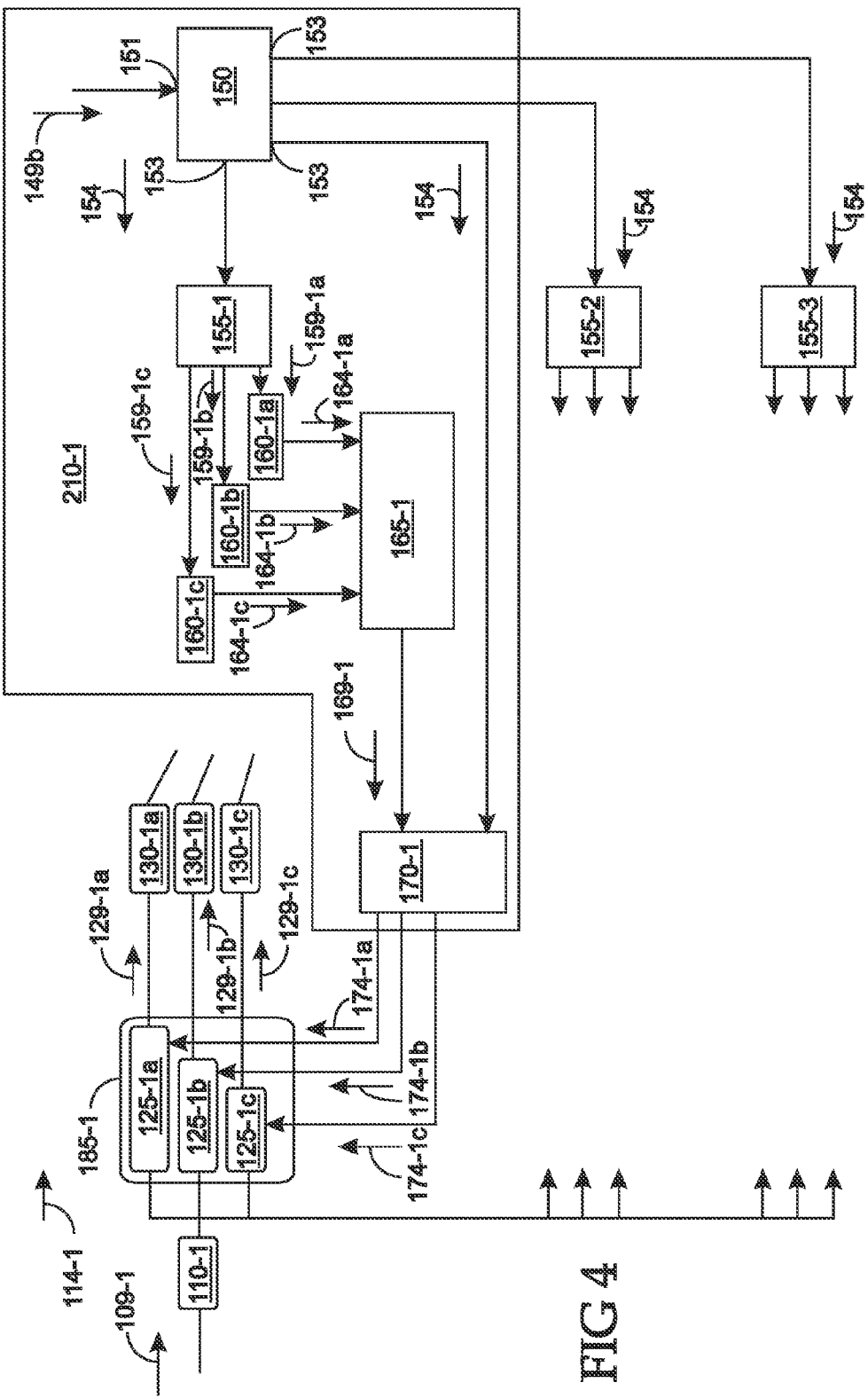
FIG. 4 is a detailed view of a part of FIG. 3.

In the representative embodiment of FIG. 3, a master-oscillator beam 109 is generated by the master oscillator 105 and is split into multiple beans by the outer loop beam splitter 110. Each of the split beams is then separately transferred to one of the multiple inner loop phase modulators 125 in its associated sub-nest 185. Each of the multiple inner loop phase modulators 125 adjusts the phase of the beam that it receives based on an inner loop feedback signal 174 which it receives from an inner feedback loop module 210 (FIG. 4) comprising the outer loop detector 150, one of the synchronous processors 155, one of the diagnostic phase adjusters 160 which could be multiple diagnostic phase adjusters 160-1a,160-1b,160-1c as shown in FIG. 4, one of the inner loop detectors 165, and one of the inner loop processors 170. Note that only the first inner feedback loop module 210-1 is shown in FIG. 2 and that it shares the outer loop detector 150 with the other inner feedback loop modules 210 and with the outer loop feedback loop module 220. The phase adjusted signals from each of the inner loop phase modulators 125 is separately transferred to one of the laser amplifiers 130 which each amplify the signal that it receives. The output signals from the multiple laser amplifiers 130 are each split into a primary laser beam 139a and a sampled laser beam 139b. The sampled laser beams 139b are directed to one of the diagnostic phase adjusters 160 of the inner feedback loop module 210. The primary laser beams 139a are directed to the beam combiner optical system 140 which combines them into a single combined beam 144. The single combined beam 144 is then sampled by the output beam sampler 145 by splitting the beam that it receives into a primary output beam 149a and a sampled output beam 149b. The sampled output beam 149b is directed to the outer loop detector 150 as one of the inputs to the inner feedback loop modules 210. The primary output beam 149a is outputted from the system.

FIG. 4 is a detailed view of a part of FIG. 3. Note that in FIG. 4, the synchronous processors 155 of FIG. 3 have been identified as a first synchronous processor 155-1, a second synchronous processor 155-2, and a third synchronous processor 155-3. For clarity and ease of illustration, the components following the second and third synchronous processors 155-2,155-3 are not shown in FIG. 4. However, the discussion of components that follow the first synchronous processor 155-1 is representative of that for the second and third synchronous processors 155-2,155-3. Also, each diagnostic phase adjuster 160 shown in FIG. 3 is represented in FIG. 4 as a first diagnostic phase adjuster 160-1a, a second diagnostic phase adjuster 160-1b, and a third diagnostic phase adjuster 160-1c. For clarity and ease of illustration in FIG. 4, coupling points are omitted except for those on the outer loop detector 150.

The first synchronous processor 155-1 outputs a first synchronous-processor signal 159-1a to the first diagnostic phase adjuster 160-1a, a second synchronous-processor signal 159-1b to the second diagnostic phase adjuster 160-1b, and a third synchronous-processor signal 159-1c to the third diagnostic phase adjuster 160-1c. A first inner loop detector 165-1 receives a first diagnostic-phase-adjuster beam 164-1a from the first diagnostic phase adjuster 160-1a, a second diagnostic-phase-adjuster beam 164-1b from the second diagnostic phase adjuster 160-1b, and a third diagnostic-phase-adjuster beam 164-1c from the third diagnostic phase adjuster 160-1c. The first inner loop detector 165-1 then outputs a first inner-loop-detector signal 169-1 which is transferred to a first inner loop processor 170-1 which processes these signals as described above. The first inner loop processor 170-1 then transfers these processed signals as the first inner loop feedback signal 174-1a, the second inner loop feedback signal 174-1b, and the third inner loop feedback signal 174-1c separately to the first inner loop phase modulator 125-1a, the second inner loop phase modulator 125-1b, and the third inner loop phase modulator 125-1c.

Referring to FIG. 3, the master oscillator 105 has a master-oscillator output 108 which couples a master-oscillator beam 109 generated by the master oscillator 105 to an outer-loop-beam-splitter input 111 of the outer loop beam splitter 110 wherein such coupling could be enabled optically. The outer loop beam splitter 110 splits the master-oscillator beam 109 into multiple outer-loop-beam-splitter beams 114. The outer loop beam splitter 110 has an outer-loop-beam-splitter output 113 which couples each outer-loop-beam-splitter beam 114 to a first inner-loop-phase-modulator input 126 of a different one of the multiple inner loop phase modulators 125 wherein such coupling could be enabled optically. Each inner loop phase modulator 125 adjusts the phase of the beam it receives based on an inner loop feedback signal 174 coupled from an associated inner loop processor 170 wherein such coupling could be enabled electronically or by other appropriate means. Each of the multiple inner loop phase modulators 125 has an inner-loop-phase-modulator output 128 which couples an inner-loop-phase-modulated beam 129 to a laser-amplifier input 131 of a different one of the multiple laser amplifiers 130 wherein such coupling could be enabled optically. Each laser amplifier 130 creates a laser beam 134 by amplifying the beam it receives.

Each laser amplifier 130 has a laser-amplifier output 133 which couples the laser beam 134 to the output beam splitter 135 which splits each incident laser beam 134 into a primary laser beam 139*a* and a sampled laser beam 139*b* wherein such coupling could be enabled optically. Each primary laser beam 139*a* is coupled to a beam combiner optical system 140 which combines the primary laser beams 139*a* into a combined beam 144 and couples the combined beam 144 to the output beam sampler 145 wherein such coupling could be enabled optically. The output beam sampler 145 splits the combined beam 144 into a primary output beam 149*a* which is the output of the system 100 and a sampled output beam 149*b* which is used in the inner feedback loop module 210 wherein such coupling could be enabled optically.

The output beam sampler 145 couples the sampled output beam 149*b* to an outer-loop-detector input 151 of the outer loop detector 150 wherein such coupling could be enabled optically. Each sampled laser beam 139*b* is coupled to a diagnostic phase adjuster 160 wherein such coupling could be enabled optically. The outer loop detector 150 has multiple outer-loop-detector outputs 153 which couple an outer-loop-detector signal 154 representative of the power contained in the sampled output beam 149*b* to an outer-loop-processor input 176 of the outer loop processor 175 wherein such coupling could be enabled electronically or by other appropriate means and multiple of which each separately couple an outer-loop-detector signal 154 again representative of the sampled output beam 149*b* to a synchronous-processor input 156 of one of multiple synchronous processors 155 wherein such coupling could be enabled electronically or by other appropriate means. Each synchronous processor 155 processes the signal that it receives to create a set of multiple synchronous-processor signals 159 in accordance with the method chosen for actively changing the phases of the individual laser beams 134 in order to synchronize their phases. Each of the multiple synchronous processors 155 has a synchronous processor output 158 which couples the synchronous-processor signal 159 to a diagnostic phase adjuster input 161 of the diagnostic phase adjuster 160 wherein such coupling could be enabled electronically or by other appropriate means. Each of the diagnostic phase adjusters 160 adjust the phases of their associated, incident sampled laser beams 139*b* and transfers the adjusted sampled laser beams 139*b* as diagnostic-phase-adjuster beams 164 to an inner-loop-detector input 166 of its associated inner loop detector 165. This transfer could occur optically. Each inner loop detector 165 converts the diagnostic-phase-adjuster beam 164 at its input to an inner-loop-detector signal 169. Each of the multiple inner loop detectors 165 has an inner-loop-detector output 168 which couples its associated inner-loop-detector signal 169 to an inner-loop-processor input 171 of the inner loop processor 170 wherein such coupling could be enabled electronically or by other appropriate means. Each inner loop processor 170 processes the signal that it receives to create an inner loop feedback signal 174 in accordance with the method chosen for actively changing the phases of the lasers in order to synchronize their phases.

As disclosed above, each of the multiple inner loop processors 170 has an inner-loop-processor output 173 which couples its inner loop feedback signal 174 to the second inner-loop-phase-modulator input 127 of its associated inner loop phase modulator 125 where such coupling could be enabled electronically or by other appropriate means. The second inner-loop-phase-modulator input 127 is also referred to as the electronic inner-loop-phase-modulator input 127, and the first inner-loop-phase-modulator input 126 is also referred to as the optical inner-loop-phase-modulator input 126. The inner loop phase modulator 125 adjusts the phase of the inner-loop-phase-modulated beam 129 based on the inner loop feedback signal 174.

Figure 5:
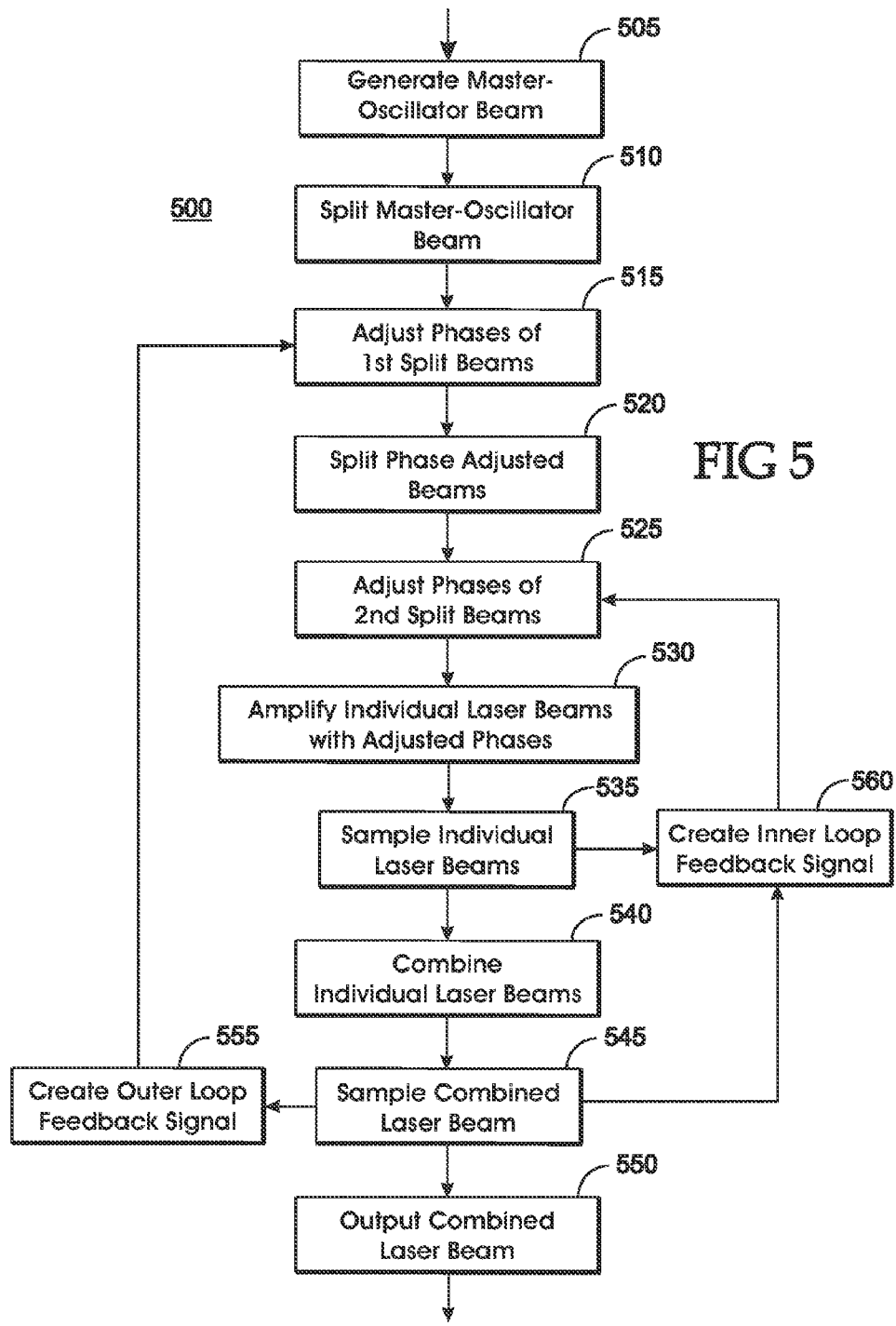
FIG. 5 is a flow chart of a method for combining laser beams in a nested loop system with single stage combiner as described in various representative embodiments.

FIG. 5 is a flow chart of a method 500 for combining laser beams 134 in a nested loop system 100 with single stage combiner 140 as described in various representative embodiments. In block 505 of FIG. 5, a master-oscillator beam 109 is generated. The master-oscillator beam 109 could be generated by the master oscillator 105. Block 505 then transfers control to block 510.

In block 510, the master oscillator beam 109 is split into multiple first split beans 114 such as the outer-loop-beam-splitter beams 114 which splitting could be performed by the outer loop beam splitter 110. Block 510 then transfers control to block 515.

In block 515, the phase of each of the first split beams 114 is separately adjusted based on a second feedback signal 179 which could be the outer loop feedback signal 179 received from an outer feedback loop module 220 comprising the outer loop detector 150 and the outer loop processor 175. The phase adjustment could be performed by multiple outer loop phase modulators 115 which results in multiple first phase adjusted beams 119 which could be the outer-loop-phase-modulated beams 119. Block 515 then transfers control to block 520.

In block 520, the phase adjusted beams resulting from the actions of block 515 are separately split into multiple second split beans 124 such as the inner-loop-beam-splitter beams 124 which splitting could be performed by the inner loop beam splitter 120. Block 520 then transfers control to block 525.

In block 525, the phase of each of the second split beams 124 resulting from the actions of block 520 is separately adjusted based on one of multiple first feedback signals 174 which could be the inner loop feedback signals 174 received from an inner feedback loop module 210 comprising the output beam splitter 135, the output beam sampler 145, the outer loop detector 150, one of the synchronous processors 155, one of the diagnostic phase adjusters 160, one of the inner loop detectors 165, and one of the inner loop processors 170. The phase adjustment could be performed by multiple inner loop phase modulators 125 and could result in multiple second phase adjusted beams 129 which could be the multiple inner-loop-phase-modulated beams 129. Block 525 then transfers control to block 530.

In block 530, individual laser beams 134 are each amplified. This amplification could be performed by the laser amplifiers 130. Block 530 then transfers control to block 535.

In block 535, the amplified individual laser beams 134 are sampled by splitting each into a sampled laser beam 139*b* and a primary laser beam 139*a*. The sampled laser beams 139*b* could be directed to one of the diagnostic phase adjusters 160 of the inner feedback loop module 210. Block 535 then transfers control to block 540.

In block 540, the primary laser beams 139*a* are combined which combining could be performed by the beam combiner optical system 140 resulting in the combined beam 144. Block 540 then transfers control to block 545.

In block 545, the combined beam 144 resulting from the actions of block 540 is sampled by splitting it into a sampled output beam 149*b* and a primary output beam 149*a*. Block 545 then transfers the primary output beam 149*a* to block 550 and the sampled output beam 149*b* separately to blocks 555 and 560.

In block 550, the primary output beam 149*a* is outputted from the system.

In block 555, the second feedback signals 179 are created in the outer feedback loop module 220 comprising the outer loop detector 150 and the outer loop processor 175 by appropriate processing of the sampled output beam 149*b*. Block 555 then transfers the second feedback signals 179 which is representative of the sampled output beam 149*b* to block 515.

In block 560, the first feedback signal 174 is created by appropriate processing of the individual sampled laser beams 139*b* and the sampled output beam 149*b*. This processing could be performed by the inner feedback loop module 210 comprising the output beam splitter 135, the output beam sampler 145, the outer loop detector 150, one of the synchronous processors 155, one of the diagnostic phase adjusters 160, one of the inner loop detectors 165, and one of the inner loop processors 170. Block 555 then transfers the first feedback signals 174 which is representative of the individual sampled laser beams 139*b* and the sampled output beam 149*b* to block 525.

Figure 6:
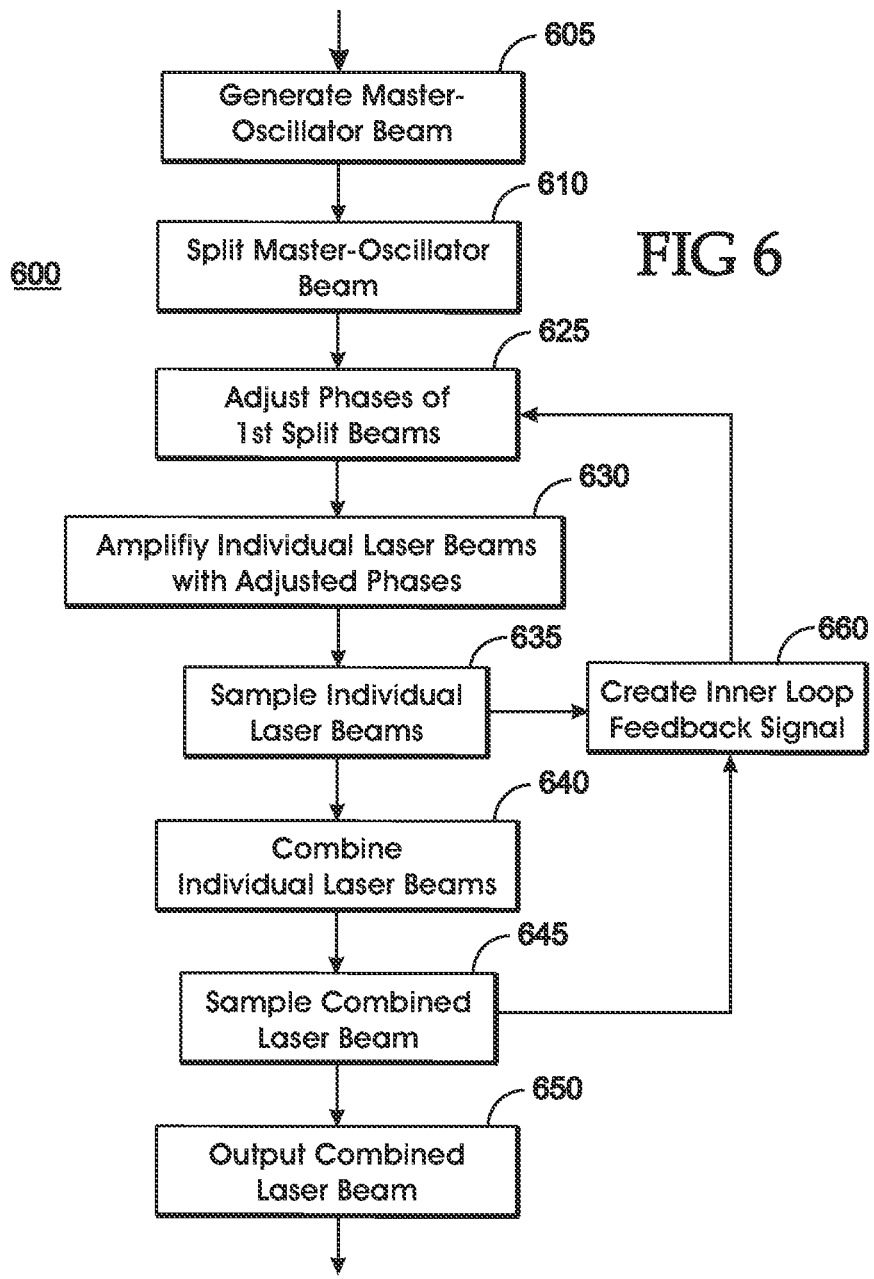
FIG. 6 is a flow chart of another method for combining laser beams in a nested loop system with single stage combiner as described in various representative embodiments.

FIG. 6 is a flow chart of another method 600 for combining laser beams 134 in a nested loop system 100 with single stage combiner 140 as described in various representative embodiments. In block 605 of FIG. 6, a master-oscillator beam 109 is generated. The master-oscillator beam 109 could be generated by the master oscillator 105. Block 605 then transfers control to block 610.

In block 610, the master oscillator beam 109 is split into multiple first split beans 114 such as the outer-loop-beam-splitter beams 114 which splitting could be performed by the outer loop beam splitter 110. Block 610 then transfers control to block 625.

In block 625, the phase of each of the first split beams 114 resulting from the actions of block 610 is separately adjusted based on one of multiple first feedback signals 174 which could be the inner loop feedback signals 174 received from an inner feedback loop module 210 comprising the output beam splitter 135, the output beam sampler 145, the outer loop detector 150, one of the synchronous processors 155, one of the diagnostic phase adjusters 160, one of the inner loop detectors 165, and one of the inner loop processors 170. The phase adjustment could be performed by multiple inner loop phase modulators 125 and could result in multiple second phase adjusted beams 129 which could be the multiple inner-loop-phase-modulated beams 129. Block 625 then transfers control to block 630.

In block 630, individual laser beams 134 are each amplified. This amplification could be performed by the laser amplifiers 130. Block 630 then transfers control to block 635.

In block 635, the amplified individual laser beams 134 are sampled by splitting each into a sampled laser beam 139*b* and a primary laser beam 139*a*. The sampled laser beams 139*b* could be directed to one of the diagnostic phase adjusters 160 of the inner feedback loop module 210. Block 635 then transfers control to block 640.

In block 640, the primary laser beams 139*a* are combined which combining could be performed by the beam combiner optical system 140 resulting in the combined beam 144. Block 640 then transfers control to block 645.

In block 645, the combined beam 144 resulting from the actions of block 640 is sampled by splitting it into a sampled output beam 149*b* and a primary output beam 149*a*. Block 645 then transfers the primary output beam 149*a* to block 650 and the sampled output beam 149*b* to block 660.

In block 650, the primary output beam 149*a* is outputted from the system.

In block 660, the first feedback signal 174 is created by appropriate processing of the individual sampled laser beams 139*b* and the sampled output beam 149*b*. This processing could be performed by the inner feedback loop module 210 comprising the output beam splitter 135, the output beam sampler 145, the outer loop detector 150, one of the synchronous processors 155, one of the diagnostic phase adjusters 160, one of the inner loop detectors 165, and one of the inner loop processors 170. Block 655 then transfers the first feedback signals 174 which is representative of the individual sampled laser beams 139*b* and the sampled output beam 149*b* to block 625.

Embodiment 1 is directed to a nested loop system 100 for combining coherent laser beams 134. The system 100 includes multiple laser amplifiers 130 each configured for emitting one of the laser beams 134, an output beam splitter 135 configured for splitting each laser beam 134 into a primary laser beam 139*a* and a sampled laser beam 139*b* both of which are associated with a different one of the lasers 130 and for coupling each sampled laser beam 139*b* to an inner feedback loop module 210, a beam combiner optical system 140 configured for combining the primary laser beams 139*a* into a combined beam 144 and coupling the combined beam 144 to an output beam sampler 145, the output beam sampler 145 configured for splitting the combined beam 144 into a primary output beam 149*a* and a sampled output beam 149*b* and for coupling the sampled output beam 149*b* to the inner feedback loop module 210, multiple inner loop phase modulators 125, and the inner feedback loop module 210. Each laser beam 134 is coupled to an output beam splitter 135; each primary laser beam 139*a* is coupled to a beam combiner optical system 140; each inner loop phase modulator 125 is paired with and coupled to a different one of the multiple laser amplifiers 130; for each laser amplifier 130 the inner feedback loop module 210 is configured to use the sampled output beam 149*b* and the sampled laser beam 139*b* associated with that laser amplifier 130 to create a different inner loop feedback signal 174 and to couple that inner loop feedback signal 174 to the inner loop phase modulator 125 associated with that laser amplifier 130; and each inner loop phase modulator 125 uses an input beam 124 developed from a master-oscillator beam 109 and its associated inner loop feedback signal 174 to adjust the phase of its associated laser amplifier 130.

Embodiment 2 is directed to a nested loop system 100 for combining coherent laser beams 134. The system 100 includes multiple laser amplifiers 130 each configured for emitting one of the laser beams 134, an output beam splitter 135 configured for splitting each laser beam 134 into a primary laser beam 139*a* and a sampled laser beam 139*b* both of which are associated with a different one of the lasers 130 and for coupling each sampled laser beam 139*b* to an inner feedback loop module 210, an output beam sampler 145 configured for splitting the combined beam 144 into a primary output beam 149*a* and a sampled output beam 149*b* and for coupling the sampled output beam 149*b* to the inner feedback loop module 210, multiple inner loop phase modulators 125, and the inner feedback loop module 210. Each laser beam 134 is coupled to an output beam splitter 135; the primary laser beams 139a form a combined beam 144 which is coupled to an output beam sampler 145; each inner loop phase modulator 125 is paired with and coupled to a different one of the multiple laser amplifiers 130; for each laser amplifier 130 the inner feedback loop module 210 is configured to use the sampled output beam 149b and the sampled laser beam 139b associated with that laser amplifier 130 to create a different inner loop feedback signal 174 and to couple that inner loop feedback signal 174 to the inner loop phase modulator 125 associated with that laser amplifier 130; and each inner loop phase modulator 125 uses an input beam 124 developed from a master-oscillator beam 109 and its associated inner loop feedback signal 174 to adjust the phase of its associated laser amplifier 130.

Embodiment 3 is directed to a method 500,600 for combining coherent laser beams 134 in a nested loop system 100. The method 500,600 includes emitting one of the laser beams 134 by each of multiple laser amplifiers 130, splitting each laser beam 134 into a primary laser beam 139a and a sampled laser beam 139b both of which are associated with a different one of the lasers 130 and coupling each sampled laser beam 139b to an inner feedback loop module 210, combining the laser beams 134 into a combined beam 144, splitting the combined beam 144 into a primary output beam 149a and a sampled output beam 149b and coupling the sampled output beam 149b to the inner feedback loop module 210, pairing each of multiple inner loop phase modulators 125 with and coupling to a different one of the multiple laser amplifiers 130, and creating an inner loop feedback signal 174 for each laser amplifier 130 in the inner feedback loop module 210 using the sampled output beam 149b and the sampled laser beam 139b associated with that laser amplifier 130 and coupling that inner loop feedback signal 174 to the inner loop phase modulator 125 associated with that laser amplifier 130. Each inner loop phase modulator 125 uses an input beam 124 developed from a master-oscillator beam 109 and its associated inner loop feedback signal 174 to adjust the phase of its associated laser amplifier 130.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

For other representative embodiments, the number of outer loop detectors 150 could be other than the number shown and discussed herein; the number of inner loop detectors 165 could be other than the number shown and discussed herein; the number of inner loop processors 170 could be other than the number shown and discussed herein; the number of outer loop phase modulators 115 could be other than the number shown and discussed herein; the number of inner loop beam splitters 120 could be other than the number shown and discussed herein; the number of inner loop phase modulators 125 could be other than the number shown and discussed herein; the number of laser amplifiers 130 could be other than the number shown and discussed herein; the number of sub-nests 185 could be other than the number shown and discussed herein; the number of inner loop phase modulators 125 in any of the sub-nests 185 can be other than the number shown and discussed herein; and the number of inner loop phase modulators 125 in any given sub-nest 185 need not be the same number as in any other sub-nest 185.

What is claimed is:

1. A nested loop system for combining coherent laser beams, comprising:

multiple laser amplifiers each configured for emitting one of the laser beams, wherein each laser beam is coupled to an output beam splitter;

the output beam splitter configured for splitting each laser beam into a primary laser beam and a sampled laser beam both of which are associated with a different one of the lasers and for coupling each sampled laser beam to an inner feedback loop module, wherein each primary laser beam is coupled to a beam combiner optical system;

the beam combiner optical system configured for combining the primary laser beams into a combined beam and coupling the combined beam to an output beam sampler;

the output beam sampler configured for splitting the combined beam into a primary output beam and a sampled output beam and for coupling the sampled output beam to the inner feedback loop module;

multiple inner loop phase modulators, wherein each inner loop phase modulator is paired with and coupled to a different one of the multiple laser amplifiers; and the inner feedback loop module, wherein for each laser amplifier the inner feedback loop module is configured to use the sampled output beam and the sampled laser beam associated with that laser amplifier to create a different inner loop feedback signal and to couple that inner loop feedback signal to the inner loop phase modulator associated with that laser amplifier and wherein each inner loop phase modulator uses an input beam developed from a master-oscillator beam and its associated inner loop feedback signal to adjust the phase of its associated laser amplifier.

2. The nested loop system as recited in claim 1, further comprising:

multiple outer loop phase modulators each configured for outputting a beam to a different one of multiple inner loop beam splitters;

the multiple inner loop beam splitters each configured for splitting the beam outputted from its associated outer loop phase modulator and for coupling those split beams separately to each inner loop phase modulator in a sub-nest comprising at least two inner loop phase modulators, wherein those split beams are the input beams related to a master-oscillator beam used by each inner loop phase modulator with its associated inner loop feedback signal to adjust the phase of its associated laser amplifier; and an outer feedback loop module, wherein for each outer loop phase modulator the outer feedback loop module is configured to use the sampled output beam to create a separate outer loop feedback signal and to couple that outer loop feedback signal to that outer loop phase modulator and wherein each outer loop modulator uses another beam developed from a master-oscillator beam and its associated outer loop feedback signal to adjust the phase of its outputted beam.

3. The nested loop system as recited in claim 2, wherein the outer feedback loop module comprises:

an outer loop detector configured to receive the sampled output beam and transfer an electronic representation of the sampled output beam to an outer loop processor; and the outer loop processor configured to process a signal from the outer loop detector representative of the sampled output beam that it detects and output associated outer loop feedback signals.

4. The nested loop system as recited in claim 2, further comprising:

a master oscillator configured to generate a master-oscillator beam and couple it to an outer loop beam splitter; and the outer loop beam splitter configured for splitting the master-oscillator beam and for separately coupling each split beam to a different one of the outer loop phase modulators.

5. The nested loop system as recited in claim 1, wherein the phases of the individual laser amplifiers are synchronized using one or more techniques selected from the group consisting of the Heterodyne method, the Synchronous Multidither (LOCSET) method, and the Stochastic Parallel Gradient Descent (SPGD) method.

6. The nested loop system as recited in claim 1, further comprising:

additional levels of nests.

7. The nested loop system as recited in claim 1, wherein the inner feedback loop module comprises:

an outer loop detector configured to receive the sampled output beam and transfer an electronic representation of the sampled output beam to multiple synchronous processors;

the multiple synchronous processors each configured to process the electronic representation of the sampled output beam that it receives and electronically couples that processed signal to an associated one of the multiple diagnostic phase adjusters;

the multiple diagnostic phase adjuster each configured to adjust the phase of each sampled laser beam that it receives in response to the processed signal that it receives from its associated synchronous processor;

multiple inner loop detectors each configured to detect the phase adjusted beams from its associated diagnostic phase adjuster; and multiple inner loop processors each configured to process signals from its associated inner loop detector representative of the phase adjusted beams that it detects and output associated inner loop feedback signals.

8. The nested loop system as recited in claim 1, further comprising:

a master oscillator configured to generate a master-oscillator beam and couple it to an outer loop beam splitter; and the outer loop beam splitter configured for splitting the master-oscillator beam and for separately coupling each split to a different one of the inner loop phase modulators.

9. A nested loop system for combining coherent laser beams, comprising:

multiple laser amplifiers each configured for emitting one of the laser beams, wherein each laser beam is coupled to an output beam splitter;

the output beam splitter configured for splitting each laser beam into a primary laser beam and a sampled laser beam both of which are associated with a different one of the lasers and for coupling each sampled laser beam to an inner feedback loop module, wherein the primary laser beams form a combined beam which is coupled to an output beam sampler;

the output beam sampler configured for splitting the combined beam into a primary output beam and a sampled output beam and for coupling the sampled output beam to the inner feedback loop module;

multiple inner loop phase modulators, wherein each inner loop phase modulator is paired with and coupled to a different one of the multiple laser amplifiers; and the inner feedback loop module, wherein for each laser amplifier the inner feedback loop module is configured to use the sampled output beam and the sampled laser beam associated with that laser amplifier to create a different inner loop feedback signal and to couple that inner loop feedback signal to the inner loop phase modulator associated with that laser amplifier and wherein each inner loop phase modulator uses an input beam developed from a master-oscillator beam and its associated inner loop feedback signal to adjust the phase of its associated laser amplifier.

10. The nested loop system as recited in claim 9, further comprising:

multiple outer loop phase modulators each configured for outputting a beam to a different one of multiple inner loop beam splitters;

the multiple inner loop beam splitters each configured for splitting the beam outputted from its associated outer loop phase modulator and for coupling those split beams separately to each inner loop phase modulator in a subnest comprising at least two inner loop phase modulators, wherein those split beams are the input beams related to a master-oscillator beam used by each inner loop phase modulator with its associated inner loop feedback signal to adjust the phase of its associated laser amplifier; and an outer feedback loop module, wherein for each outer loop phase modulator the outer feedback loop module is configured to use the sampled output beam to create a separate outer loop feedback signal and to couple that outer loop feedback signal that outer loop phase modulator and wherein each outer loop modulator uses another beam developed from a master-oscillator beam and its associated outer loop feedback signal to adjust the phase of its outputted beam.

11. The nested loop system as recited in claim 10, wherein the outer feedback loop module comprises:

an outer loop detector configured to receive the sampled output beam and transfer an electronic representation of the sampled output beam to an outer loop processor; and the outer loop processor configured to process signals from the outer loop detector representative of the sampled output beam that it detects and output associated outer loop feedback signals.

12. The nested loop system as recited in claim 1, wherein the inner feedback loop module comprises:

an outer loop detector configured to receive the sampled output beam and transfer an electronic representation of the sampled output beam to multiple synchronous processors;

the multiple synchronous processors each configured to process the electronic representation of the sampled output beam that it receives and electronically couples that processed signal to an associated one of the multiple diagnostic phase adjusters;

the multiple diagnostic phase adjuster each configured to adjust the phase of each sampled laser beam that it receives in response to the processed signal that it receives from its associated synchronous processor;

multiple inner loop detectors each configured to detect the phase adjusted beams from its associated diagnostic phase adjuster; and multiple inner loop processors each configured to process signals from its associated inner loop detector representative of the phase adjusted beams that it detects and output associated inner loop feedback signals.

13. A method for combining coherent laser beams in a nested loop system, comprising:
- emitting one of the laser beams by each of multiple laser amplifiers;
- splitting each laser beam into a primary laser beam and a sampled laser beam both of which are associated with a different one of the lasers and coupling each sampled laser beam to an inner feedback loop module;
- combining the laser beams into a combined beam;
- splitting the combined beam into a primary output beam and a sampled output beam and coupling the sampled output beam to the inner feedback loop module;
- pairing each of multiple inner loop phase modulators with and coupling to a different one of the multiple laser amplifiers; and
- creating an inner loop feedback signal for each laser amplifier in the inner feedback loop module using the sampled output beam and the sampled laser beam associated with that laser amplifier and coupling that inner loop feedback signal to the inner loop phase modulator associated with that laser amplifier, wherein each inner loop phase modulator uses an input beam developed from a master-oscillator beam and its associated inner loop feedback signal to adjust the phase of its associated laser amplifier.

14. The method as recited in claim 13, further comprising:
- outputting a beam by each of multiple outer loop phase modulators to a different one of multiple inner loop beam splitters;
- splitting the beam outputted from its associated outer loop phase modulator by each of the multiple inner loop beam splitters and coupling those split beams separately to each inner loop phase modulator in an associated sub-nest comprising at least two inner loop phase modulators, wherein those split beams are the input beams related to a master-oscillator beam used by each inner loop phase modulator and its associated inner loop feedback signal to adjust the phase of its associated laser amplifier; and
- creating a separate outer loop feedback signal by an outer feedback loop module for each outer loop phase modulator with the outer feedback loop module configured to use the sampled output beam and coupling that outer loop feedback signal to second inputs of the outer loop phase modulators, wherein each outer loop modulator uses another beam developed from a master-oscillator beam and its associated outer loop feedback signal to adjust the phase of its outputted beam.

15. The method as recited in claim 14, wherein the outer feedback loop module comprises:
- an outer loop detector configured for receiving the sampled output beam and transferring an electronic representation of the sampled output beam to an outer loop processor; and
- the outer loop processor configured for processing signals from the outer loop detector representative of the sampled output beam that it detects and output associated outer loop feedback signals.

16. The method as recited in claim 14, further comprising:
- generating the master-oscillator beam by a master oscillator and coupling it to an outer loop beam splitter; and
- splitting the master-oscillator beam by the outer loop beam splitter and separately coupling each split beam to a different one of the outer loop phase modulators.

17. The method as recited in claim 13, wherein the phases of the individual laser amplifiers are synchronized using one or more techniques selected from the group consisting of the Heterodyne method, the Synchronous Multi-dither (LOC-SET) method, and the Stochastic Parallel Gradient Descent (SPGD) method.

18. The method as recited in claim 13, further comprising: additional levels of nests.

19. The method as recited in claim 13, wherein the inner feedback loop module comprises:
- an outer loop detector configured for receiving the sampled output beam and transferring an electronic representation of the sampled output beam to multiple synchronous processors;
- the multiple synchronous processors each configured for processing the electronic representation of the sampled output beam that it receives and electronically coupling that processed signal to an associated one of the multiple diagnostic phase adjusters;
- the multiple diagnostic phase adjuster each configured for adjusting the phase of each sampled laser beam that it receives in response to the processed signal that it receives from its associated synchronous processor;
- multiple inner loop detectors each configured for detecting the phase adjusted beams from its associated diagnostic phase adjuster; and
- multiple inner loop processors each configured for processing signals from its associated inner loop detector representative of the phase adjusted beams that it detects and output associated inner loop feedback signals.

20. The method as recited in claim 19, further comprising:
- generating the master-oscillator beam by a master oscillator and coupling it to an outer loop beam splitter; and
- splitting the master-oscillator beam by the outer loop beam splitter and separately coupling each split beam to a different one of the inner loop phase modulators.

* * * * *